United States Patent
Chen et al.

(10) Patent No.: US 10,726,043 B1
(45) Date of Patent: Jul. 28, 2020

(54) OPTIMIZED HASH COMPARISON IN REPLICATION OF CONTENT ADDRESSABLE STORAGE

(71) Applicant: EMC Corporation, Hopkinton, MA (US)

(72) Inventors: Xiangping Chen, Sherborn, MA (US); David Meiri, Cambridge, MA (US); William R. Stronge, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 912 days.

(21) Appl. No.: 15/195,115

(22) Filed: Jun. 28, 2016

(51) Int. Cl.
*G06F 16/00* (2019.01)
*G06F 16/27* (2019.01)
*G06F 16/22* (2019.01)

(52) U.S. Cl.
CPC .......... *G06F 16/27* (2019.01); *G06F 16/2255* (2019.01)

(58) Field of Classification Search
CPC .............................. G06F 16/27; G06F 16/2255
USPC ......................................................... 707/634
See application file for complete search history.

(56) References Cited

U.S. PATENT DOCUMENTS

| | | | | |
|---|---|---|---|---|
| 8,140,821 B1 * | 3/2012 | Raizen | ................. | G06F 11/1448 707/637 |
| 8,156,306 B1 * | 4/2012 | Raizen | .................. | G06F 3/0608 707/813 |
| 8,898,114 B1 * | 11/2014 | Feathergill | .......... | G06F 16/1752 707/648 |
| 9,208,162 B1 * | 12/2015 | Hallak | ................. | G06F 11/2094 |
| 9,286,003 B1 * | 3/2016 | Hallak | .................. | G06F 3/0653 |
| 2009/0271366 A1 * | 10/2009 | Ellison | ................. | G06F 16/9014 |
| 2010/0303338 A1 * | 12/2010 | Stojancic | ........... | G06K 9/00744 382/154 |
| 2010/0318515 A1 * | 12/2010 | Ramanathan | ........ | G06K 9/4671 707/723 |
| 2012/0084519 A1 * | 4/2012 | Vijayan | ............... | G06F 11/1453 711/162 |
| 2012/0317395 A1 * | 12/2012 | Segev | .................... | G06F 16/275 711/216 |
| 2013/0332146 A1 * | 12/2013 | Agarwal | ............. | G06F 17/2735 704/10 |
| 2017/0185326 A1 * | 6/2017 | Meiri | .................... | G06F 3/0619 |

\* cited by examiner

*Primary Examiner* — Monica M Pyo
(74) *Attorney, Agent, or Firm* — Krishnendu Gupta; Lesley Leonessa

(57) ABSTRACT

A system, computer program product, and computer-executable method for managing replication from a production site to a target site, wherein both the production site and the target site are content addressable data storage systems, the system, computer program product, and computer-executable method including processing a replication session from the production site to the target site, collecting information related to the replication session from the production site to the target site, analyzing the information to determine whether to change the processing of the replication session, upon a positive determination, modifying the processing of the replication session.

8 Claims, 6 Drawing Sheets

OPTIMIZED HASH COMPARISON IN REPLICATION OF CONTENT ADDRESSABLE STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method for managing replication from a production site to a target site, wherein both the production site and the target site are content addressable data storage systems, the system, computer program product, and computer-executable method including processing a replication session from the production site to the target site, collecting information related to the replication session from the production site to the target site, analyzing the information to determine whether to change the processing of the replication session, upon a positive determination, modifying the processing of the replication session.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
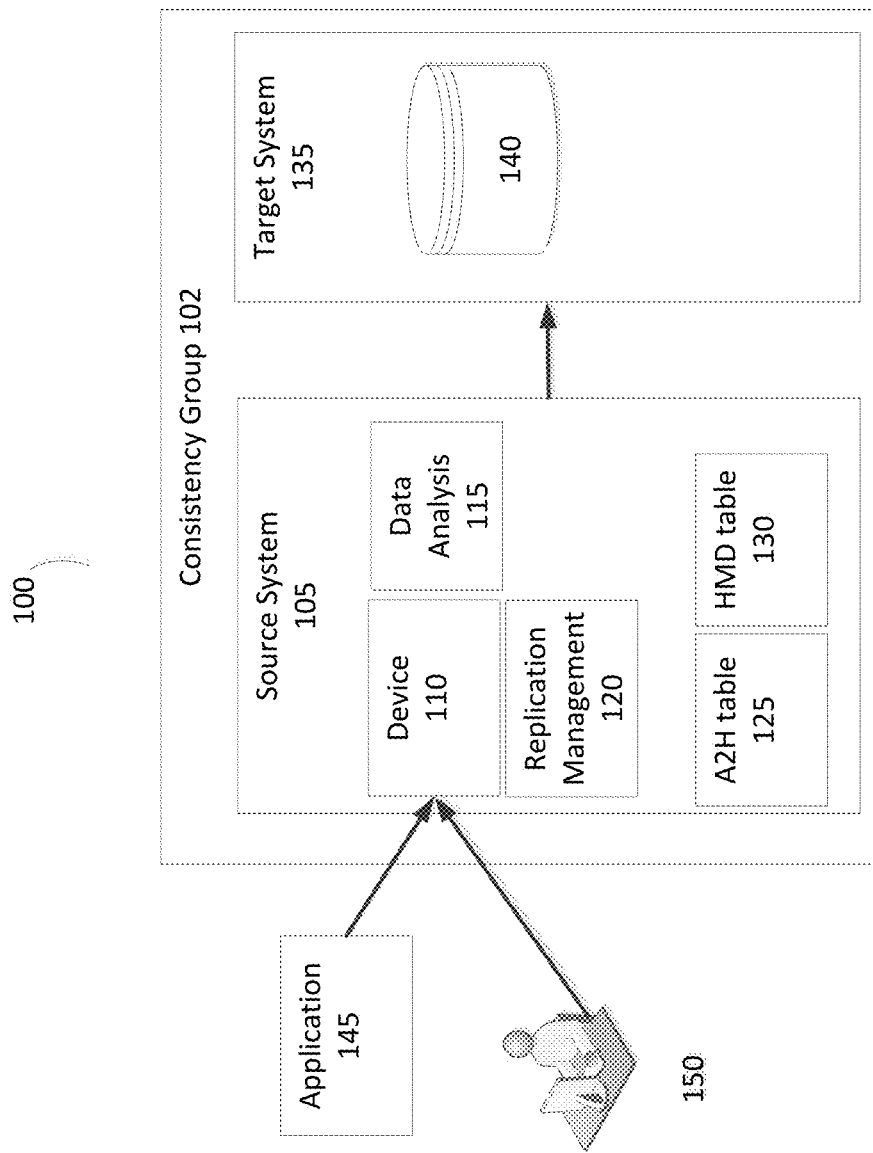
FIG. 1 is a simplified illustration of a data storage system utilizing optimized replication from a first content addressable storage (CAS) system to a second CAS system, in accordance with an embodiment of the present disclosure.

Traditionally, data storage systems use replication to maintain data between a source site and a target site. Typically, a replication session operates on data that can be classified into one of three scenarios. Generally, a first scenario, where source data and target data are nearly identical, such as re-activating a previous replication session. Conventionally, a second scenario where a source has data and the target is empty, such as migrating a volume to a new system. Traditionally, a third scenario where source and target volumes have different data, such as replicating a database with a high overwrite ratio. Typically, data storage systems operate on data that can include portions of data that conform one or more of these scenarios. Generally, data storage systems do not conform to the data being operated on and, rather, treat all data similarly during replication. Conventionally, improvements to replication with content addressable storage would be beneficial to the data storage industry.

In many embodiments, the current disclosure may enable optimization of replication sessions within a data storage system. In various embodiments, the current disclosure may enable optimization of replication sessions between content addressable storage systems. In certain embodiments, a data storage system may be enabled to modify a method of replicating between systems within the data storage system to optimize communication between the systems.

In most embodiments, for content addressable storage, the current disclosure may enable modification of hash based replication to greatly improve replication efficiency of pages with duplicate pages at a target site. In various embodiments, the current disclosure may enable a content addressable storage system to optimize hash comparison algorithms based on replication scenarios to shorten hash comparisons. In certain embodiments, the current disclosure may achieve optimized hash comparison by analyzing replication statistics, performing full hash comparisons for almost identical data, and short hash comparisons to quickly identify unique data. In many embodiments, the current disclosure may enable a data storage system to modify how the data storage system executes a replication session based on analysis of what may be currently replicated.

Hash-Based Replication

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from Flash, since the short hash handles are not unique, they cannot be easily used to check if a target contains a hash signature. In some implementations, short hash handles are shortcuts for hash signatures, and can give a reliable hint of the existence of a hash signature in an array. Described herein is an approach to use these short hash handles, verify them through the hash signature, and send the data as needed. While the description describes using this approach with de-duplication storage devices, it would be appreciated by one of ordinary skill in the art that the approach described herein may be used with any type of storage device including those that do not use de-duplication.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

Further information about Hash-Based Replication may be found in U.S. Pat. No. 9,378,106 issued on Jun. 28, 2016, assigned to EMC Corporation of Hopkinton, Mass. and is hereby incorporated by reference in its entirety.

Optimized Hash Comparison in Replication of Content Addressable Storage

In many embodiments, the current disclosure may enable a Content Addressable Storage (CAS) system to optimize replication to a target CAS system. In various embodiments, the current disclosure may enable a CAS system to bypass one or more steps of hash based replication to reduce the amount of time and/or I/O needed to complete a replication session. In certain embodiments, a CAS system may monitor replication I/O traffic between the CAS system and a target CAS system to determine how to modify a method of hash based replication between the CAS system and the target system. In some embodiments, a CAS system may monitor success and failure rates of one or more steps of hash based replication to determine whether to bypass one or more steps of the hash based replication. In most embodiments, a CAS system may be enabled to monitor statistics related to replication within a moving window of time. In various embodiments, a CAS system may be enabled to adjust which portions of hash based replication may be executed based on analysis of replication statistics within a window of time.

In most embodiments, a CAS system may initially execute a generic hash based replication, which may be a three phase replication. In various embodiments, a first step of a three phase replication process may include initially processing a short hash comparison between a source site and target site to obtain a hint of whether data at a target site may be unique. In various embodiments, a short hash match may indicate that the associated hash and associated data may be potentially at the target site. In some embodiments, potentially identical data may be further compared with a full hash handle comparison. In these embodiments, pages with matching full hash handles may be written via incrementing a reference of a single instance of data without further data transfer and write from the source to target site. In certain embodiments, a determination of no short hash match may indicate that the associated data may be unique and may lead to full page replication from the source site to the target site. In most embodiments, a three phase replication cycle may save bandwidth, but the three phase replication cycle may increase latency as two or three round trips between source and target site may be required for each replication I/O received at the source site.

In many embodiments, the current disclosure may enable a CAS system optimize hash replication from a source site to a target site. In various embodiments, the current disclosure may enable a CAS system to dynamically decide whether to bypass one or more steps of a three phase hash replication cycle. In some embodiments, the current disclosure may enable a CAS system to track a user defined window of replication I/Os to determine how quickly the data storage system to modify its method of replication.

In most embodiments, a CAS system may initially use a three phase hash replication cycle to replicate between a source site and a target site. In various embodiments, a user and/or administrator may be enabled to specify a window of time in which to analyze replication session statistics. In certain embodiments, a window of time may encompass a specified number seconds, minutes, and/or hours prior to the current replication I/O. In some embodiments, a CAS system may include a data analysis module to record and/or analyze replication session statistics. In many embodiments, a data analysis module may be enabled to store and/or analyze how often each step of a three phase hash replication succeeds or fails during a replication session.

In most embodiments, a data analysis module may collect replication I/O stats and/or identify replication scenarios based on the collected replication I/O stats. In various embodiments, a scenario with a high amount of duplication between a source and target site may skip a short hash comparison of a three phase replication cycle as each short hash handle comparison has resulted in hits. In certain embodiments, bypassing a short hash comparison may mean that a CAS system may go directly to a full hash based replication mode. In some embodiments, in a scenario where there is little overlap between a source and target data sets, a CAS system may skip both short hash and full-hash comparison and go directly to full page replication.

In many embodiments, a CAS system may be enabled to detect replication scenario changes. In various embodiments, once a CAS system detects a replication scenario change, the CAS system may be enabled to shift replication modes. For example, in some embodiments, if a replication session operates in full-hash based replication mode, when there is a large amount of unique data to be replicated, the CAS system modifies replication to fall back to conducting short hash comparisons for a quick and cheap data miss detection. In various embodiments, an actual rate threshold to trigger mode switching may be tuned to fit for different environment configurations to achieve optimal latency and bandwidth utilization.

Refer to the example embodiment of FIG. 1. FIG. 1 is a simplified illustration of a data storage system utilizing optimized replication from a first content addressable storage (CAS) system to a second CAS system, in accordance with an embodiment of the present disclosure. System 100 includes distributed system 105 and target system 135. Both distributed system 105 and target system 135 are CAS systems. In this embodiment, both distributed system 105 and target system 135 are in consistency group 102. Distributed system 105 includes device 110, data analysis module 115, and replication management module 120. Distributed system 105 utilizes Address to Hash (A2H) table 125 and Hash Meta-Data (HMD) table 130 to manage data stored on device 110. Target system 135 includes device 140, which is replicated from device 110 on distributed system 105. Device 110 is enabled to be used and/or managed by application 145 and/or user 150.

In this embodiment, distributed system 105 is enabled to replicate data from device 110 to device 140 using replication management 120. During replication sessions, distributed system 105 is enabled to utilize data analysis module 115 to collect and/or analyze statistics collected from replicating data to target system 135. Distributed system 105 is enabled to use analysis from data analysis module 115 to modify how replication management module 120 manages a replication session between distributed system 105 and target system 135.

Figure 2:
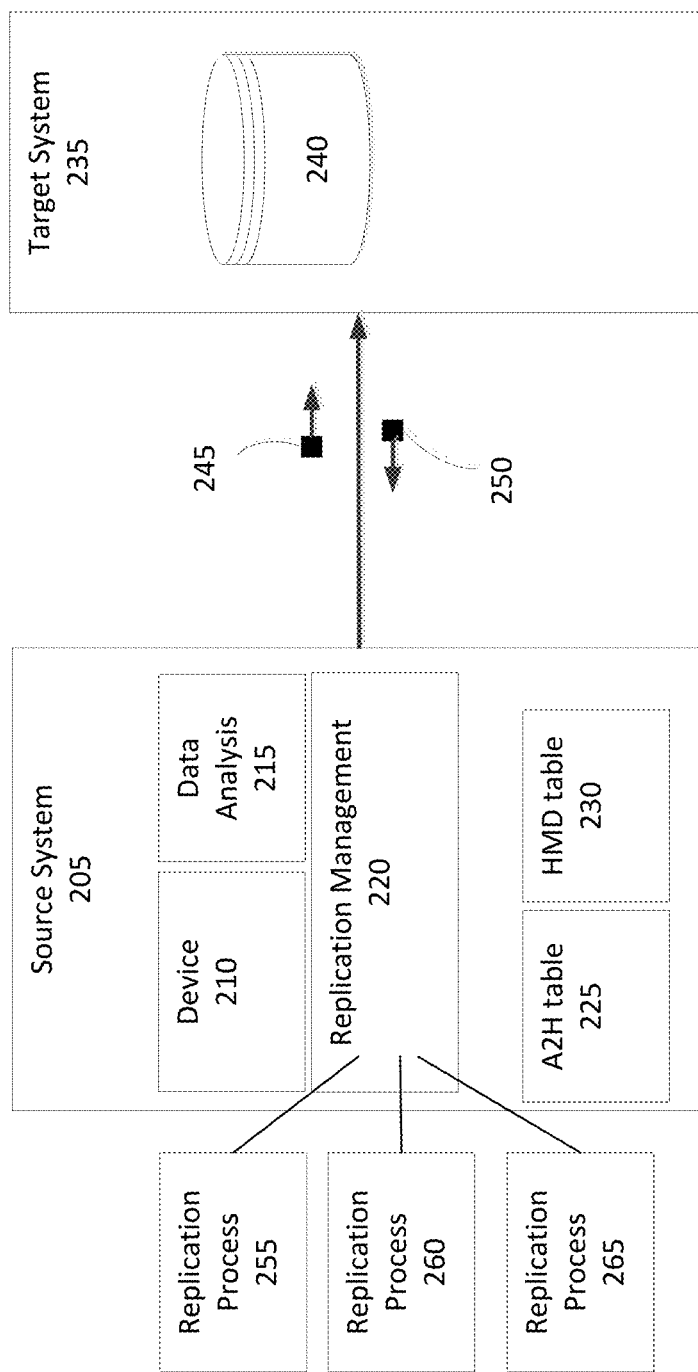
FIG. 2 is an alternate simplified illustration of a data storage system utilizing optimized replication from a first content addressable storage (CAS) system to a second CAS system, in accordance with an embodiment of the present disclosure.

Refer to the example embodiment of FIG. 2. FIG. 2 is an alternate simplified illustration of a data storage system utilizing optimized replication from a first content addressable storage (CAS) system to a second CAS system, in accordance with an embodiment of the present disclosure. In this embodiment, source system 205 is in communication with target system 235. source system includes device 210, data analysis module 215, and replication management 220. Source system utilizes Address to Hash (A2H) table 225 and Hash Meta data (HMD) table 230 to manage data storage within device 210. Target system 235 includes device 240 which is a replicated from device 210 in source system 205. In this embodiment, replication management 220 is managing replication process's 255, 260, 265. Both source system 205 and target system 235 are Content Addressable Storage (CAS) systems. Source system 205 is enabled to modify replication I/O activity based on analysis of replication I/O stats collected by data analysis module 215 during replication between source system 205 and target system 235. Source system 205 is enabled to communicate with target system 235 using message 245. Target system 235 is enabled to signal success or failure of one or more steps of replication using message 250.

During replication, source system 205 is enabled to utilize short hash comparisons, full hash comparisons, and/or full page replication based on analysis by data analysis module 215. Data analysis module 215 is enabled to determine whether replication I/Os conform to one of multiple scenarios and is enabled to provide hints to enable replication management module 220 to modify replication techniques to optimize replication between source system 205 and target system 235.

Figure 3:
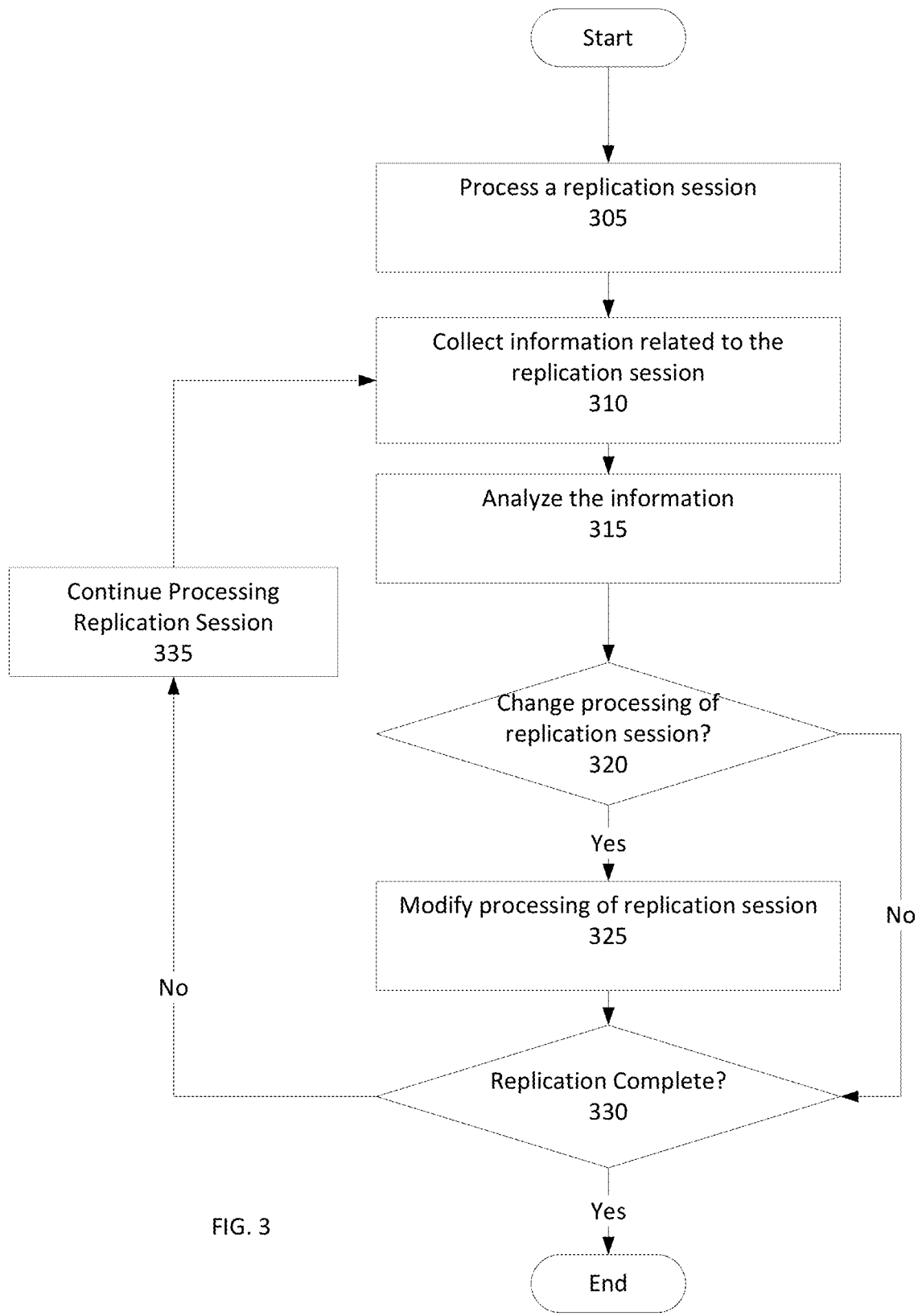
FIG. 3 is a simplified flowchart of a method of optimizing hash replication between a source and target system, in accordance with an embodiment of the present disclosure.

Refer to the example embodiments of FIGS. 2 and 3. FIG. 3 is a simplified flowchart of a method of optimizing hash replication between a source and target system, in accordance with an embodiment of the present disclosure. As shown in FIG. 2, Source system 205 is in communication with target system 235. Source system 205 includes device 210, data analysis module 215, and replication management 220. Source system utilizes Address to Hash (A2H) table 225 and Hash Meta data (HMD) table 230 to manage data storage within device 210. Target system 235 includes device 240 which is a replicated from device 210 in source system 205. Replication management module 220, within source system 205, initiates a replication process 255 using a three phase hash replication (Step 305). Data analysis module 215 collects information related to replication process 255 (Step 310). Data analysis module 215 analyzes the collected data (Step 315) and provides replication management module 220 with a hint related to replication process 255. In many embodiments, a hint may include what scenario a replication session and/or process may be currently in. Replication management module 220 determines whether to change the method of replication based on the hint (Step 320). Upon a negative determination, replication ascertains whether replication is complete (Step 330) and continues processing the replication session (Step 335) if there are more Replication I/Os to process. Upon a positive determination, replication management module 220 modifies processing of the current replication session (Step 325) and then determines whether or not replication has been completed (Step 330).

Figure 4:
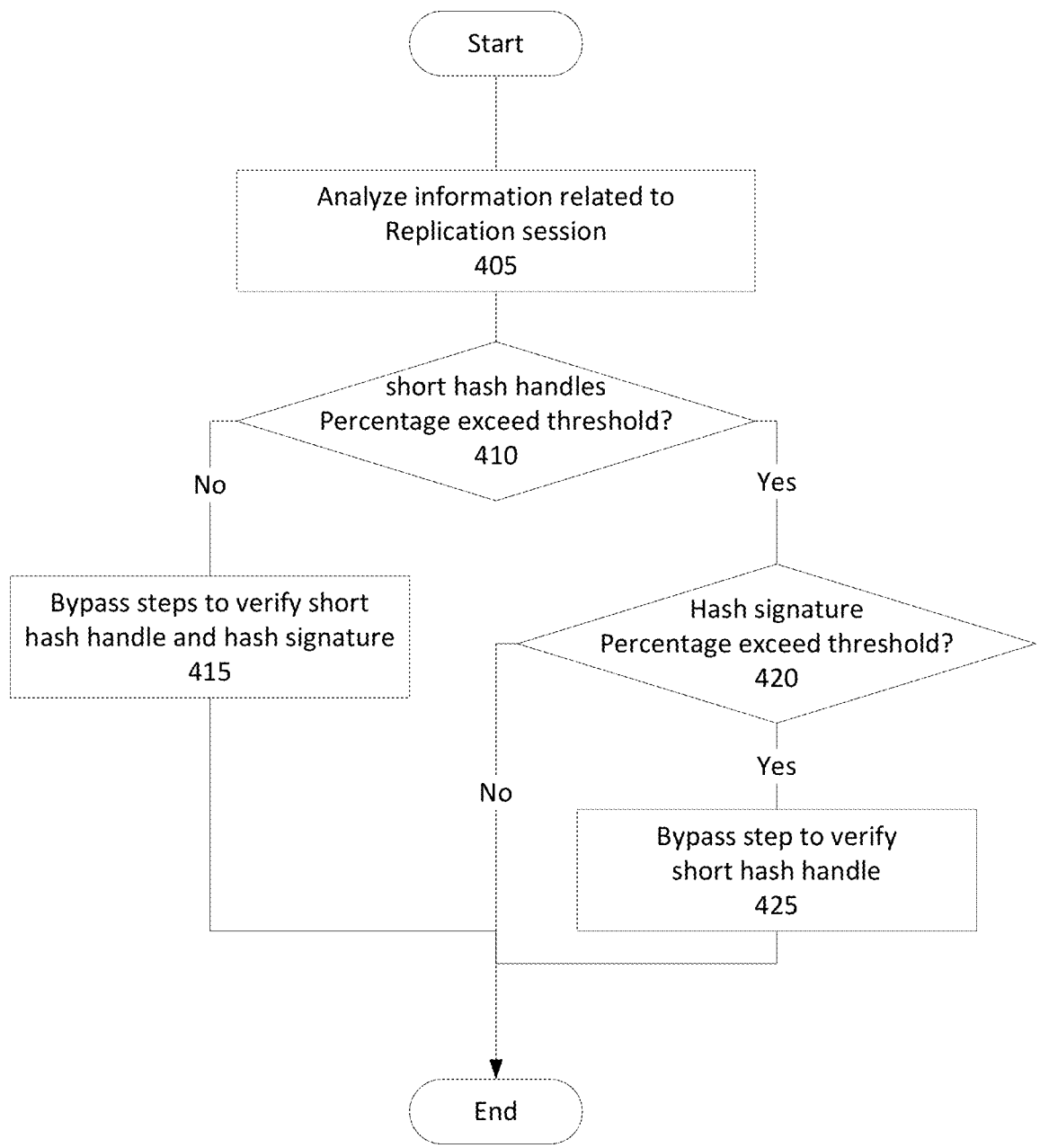
FIG. 4 is a simplified flowchart of a method of analyzing replication I/O and modifying a method of hash replication, in accordance with an embodiment of the present disclosure.

Refer to the example embodiments of FIGS. 2 and 4. FIG. 4 is a simplified flowchart of a method of analyzing replication I/O and modifying a method of hash replication, in accordance with an embodiment of the present disclosure. As shown in FIG. 2, Source system 205 is in communication with target system 235. Source system 205 includes device 210, data analysis module 215, and replication management 220. Source system utilizes Address to Hash (A2H) table 225 and Hash Meta data (HMD) table 230 to manage data storage within device 210. Target system 235 includes device 240 which is a replicated from device 210 in source system 205. During a replication session, data analysis module 215 analyzes statistical information related to replication I/O and information received from target system 235 in message 250. In many embodiments, a target system may be enabled to provide hints related to information stored at the target system. In various embodiments, a target system may be enabled to provide information whether one or more steps of a three phase hash replication method has succeeded or failed.

In this embodiment, data analysis module 215 provides information related to analysis of replication I/O statistics to replication management module 220. Replication management module 220 determines whether the short hash handle comparison success rate percentage exceeded a threshold amount (Step 410). Upon a negative determination, replication management module 220 determines to bypass steps to verify the short hash handle and hash signature and proceed to directly replicate the page of memory (Step 415). Upon a positive determination, replication management module 220 determines whether hash signature comparisons successes have exceeded a threshold amount (Step 410). Upon determining that the hash signature comparisons successes have not exceeded the threshold amount, the replication management module 220 maintains the current hash replication method. Upon determining that the hash signature comparisons successes have exceeded a threshold amount, the replication management module 220 bypasses the step to verify short hash handles in the hash replication method (Step 425).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 5:
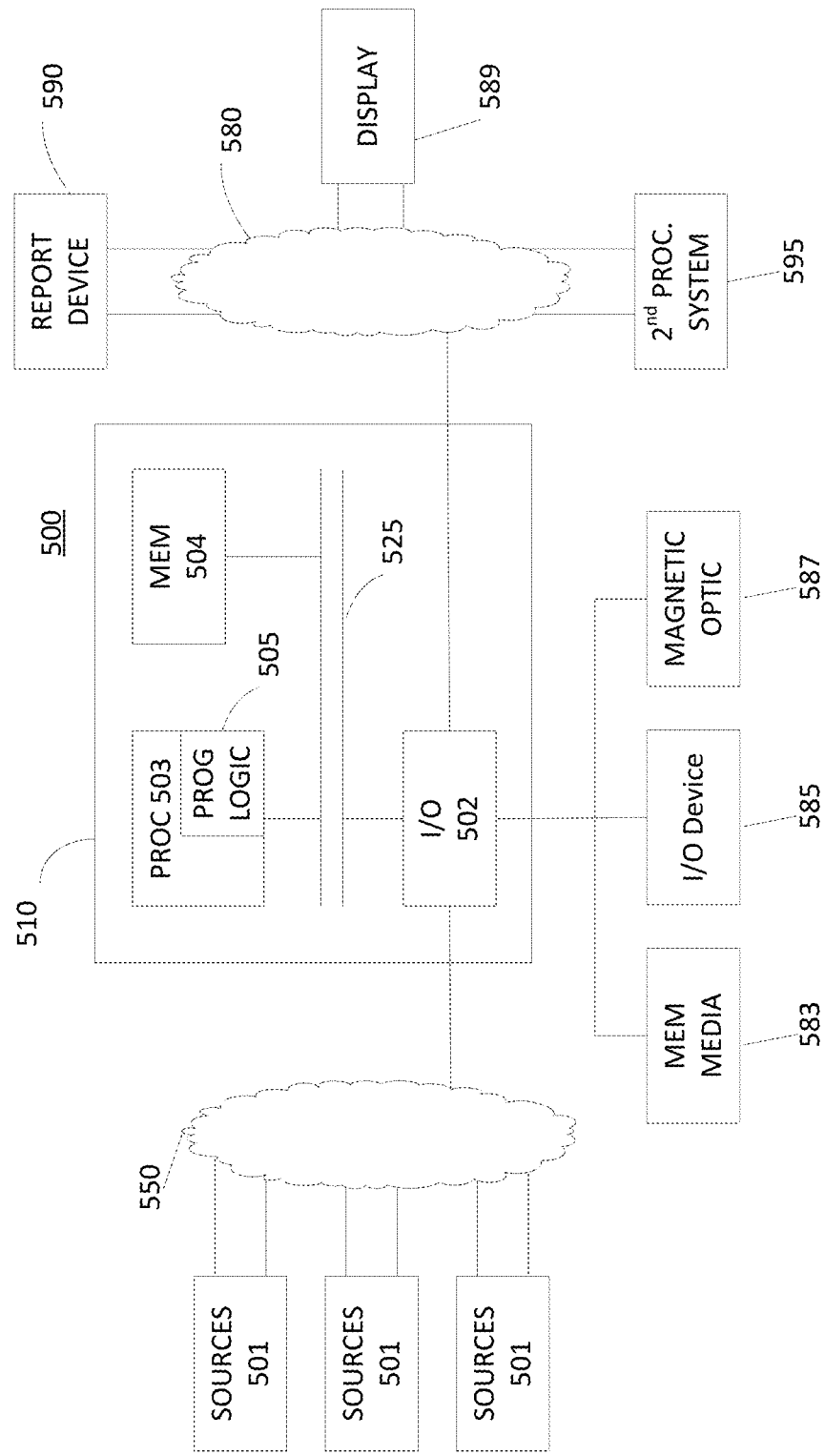
FIG. 5 is an example of an embodiment of an apparatus that may utilize the techniques described herein, in accordance with an embodiment of the present disclosure.

FIG. 5 is a block diagram illustrating an apparatus, such as a computer 510 in a network 500, which may utilize the techniques described herein according to an example embodiment of the present invention. The computer 510 may include one or more I/O ports 502, a processor 503, and memory 504, all of which may be connected by an interconnect 525, such as a bus. Processor 503 may include program logic 505. The I/O port 502 may provide connectivity to memory media 583, I/O devices 585, and drives 587, such as magnetic drives, optical drives, or Solid State Drives (SSD). When the program code is loaded into memory 504 and executed by the computer 510, the machine becomes an apparatus for practicing the invention. When implemented on one or more general-purpose processors 503, the program code combines with such a processor to provide a unique apparatus that operates analogously to specific logic circuits. As such, a general purpose digital machine can be transformed into a special purpose digital machine.

Figure 6:
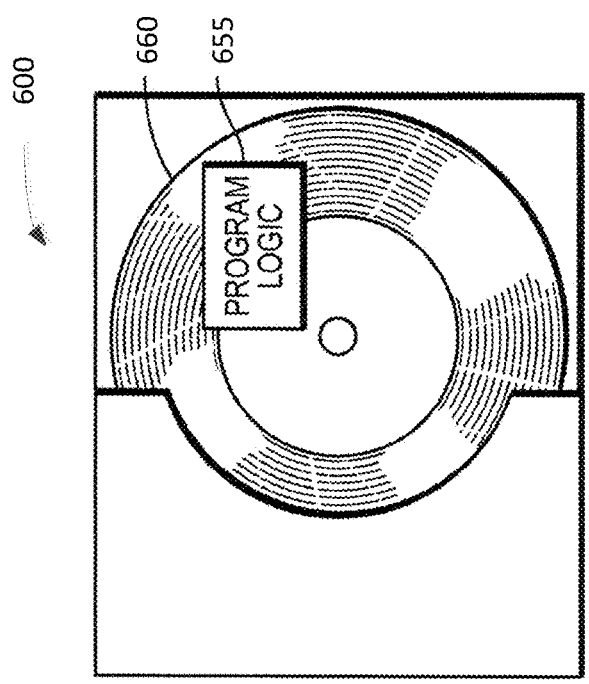
FIG. 6 is an example of a method embodied on a computer readable storage medium that may utilize the techniques described herein, in accordance with an embodiment of the present disclosure.

FIG. 6 is a block diagram illustrating a method embodied on a computer readable storage medium 660 that may utilize the techniques described herein according to an example embodiment of the present invention. FIG. 6 shows Program Logic 655 embodied on a computer-readable medium 660 as shown, and wherein the Logic is encoded in computer-executable code configured for carrying out the methods of this invention and thereby forming a Computer Program Product 600. Program Logic 655 may be the same logic 505 on memory 504 loaded on processor 503 in FIG. 5. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing replication from a production site to a target site, wherein both the production site and the target site are content addressable data storage systems, the computer-executable method comprising:

processing a replication session from the production site to the target site;

collecting information related to the replication session from the production site to the target site;

analyzing the information to determine whether to change the processing of the replication session bypassing at least one step of the processing of hash based replication to optimize the processing of the replication session; and wherein the analyzing comprises:

analyzing an amount of times a short hash handle does not exist at the target site; and if the amount of times does not exceed a threshold, making a positive determination to change the processing of the replication session; and upon the positive determination, modifying the processing of the replication session by bypassing the sending of the short hash handle and hash signature when processing the replication session; and analyzing the amount of times the hash signature does not exist at the target site; and if the amount of times exceeds the threshold, making the positive determination to change the processing of the replication session; and upon the positive determination, modifying the processing of the replication session by bypassing the sending of the short hash handle when processing the replication session.

2. The computer-executable method of claim 1, further comprising:

periodically re-analyzing the information to determine whether to change the processing of the replication session.

3. The computer-executable method of claim 1, wherein the analyzing is enabled to be conducted within a window of time.

4. A system, comprising:

a production site;

a target site, wherein the production site and the target site are content addressable data storage systems; and computer-executable program logic encoded in memory of one or more computers enabled to manage replication from the production site to the target site, wherein the computer-executable program logic is configured for the execution of:

processing a replication session from the production site to the target site;

collecting information related to the replication session from the production site to the target site;

analyzing the information to determine whether to change the processing of the replication session by bypassing at least one step of the processing of hash based replication to optimize the processing; and wherein the analyzing comprises:

analyzing an amount of times a short hash handle does not exist at the target site; and if the amount of times does not exceed a threshold, making a positive determination to change the processing of the replication session; and upon the positive determination, modifying the processing of the replication session by bypassing the sending of the short hash handle and hash signature when processing the replication session; and analyzing the amount of times the hash signature does not exist at the target site; and if the amount of times exceeds the threshold, making the positive determination to change the processing of the replication session; and upon the positive determination, modifying the processing of the replication session by bypassing the sending of the sort hash handle when processing the replication session.

5. The system of claim 4, wherein the computer-executable program logic is further configured for the execution of:

periodically re-analyzing the information to determine whether to change the processing of the replication session.

6. The system of claim 4, wherein the analyzing is enabled to be conducted within a window of time.

7. A computer program product for managing replication from a production site to a target site, wherein both the production site and the target site are content addressable data storage systems, the computer program product comprising:

a non-transitory computer readable medium encoded with computer-executable code, wherein the code is configured to enable the execution of:

processing a replication session from the production site to the target site;

collecting information related to the replication session from the production site to the target site;

analyzing the information to determine whether to change the processing of the replication session by bypassing at least one step of the processing of hash based replication to optimize the processing; and wherein the analyzing comprises:

analyzing an amount of times a short hash handle does not exist at the target site; and if the amount of times does not exceed a threshold, making a positive determination to change the processing of the replication session; and upon the positive determination, modifying the processing of the replication session by bypassing the sending of the short hash handle and hash signature when processing the replication session; and analyzing the amount of times the hash signature does not exist at the target site; and if the amount of times exceeds the threshold, making the positive determination to change the processing of the replication session; and upon the positive determination, modifying the processing of the replication session by bypassing the sending of the short hash handle when processing the replication session.

8. The computer program product of claim 7, wherein the code is further configured to enable the execution of:

periodically re-analyzing the information to determine whether to change the processing of the replication session.

\* \* \* \* \*